US009710484B2

United States Patent
Marcon et al.

(10) Patent No.: US 9,710,484 B2
(45) Date of Patent: Jul. 18, 2017

(54) METHOD AND APPARATUS FOR ASSOCIATING PHYSICAL LOCATIONS TO ONLINE ENTITIES

(71) Applicant: HERE Global B.V., Veldhoven (NL)

(72) Inventors: Massimiliano Marcon, Berlin (DE); Simon Madine, Berlin (DE); Bernd Mrohs, Veldhoven (NL)

(73) Assignee: HERE Global B.V., Veldhoven (NL)

( * ) Notice: Subject to any disclaimer, the term of this patent is extended or adjusted under 35 U.S.C. 154(b) by 204 days.

(21) Appl. No.: 14/029,483

(22) Filed: Sep. 17, 2013

(65) Prior Publication Data

US 2015/0081655 A1    Mar. 19, 2015

(51) Int. Cl.
 *G06F 17/30* (2006.01)
 *G06F 3/01* (2006.01)
 *H04W 4/18* (2009.01)
 *H04L 29/08* (2006.01)

(52) U.S. Cl.
 CPC ........ *G06F 17/30241* (2013.01); *G06F 3/01* (2013.01); *G06F 17/3087* (2013.01); *G06F 17/30864* (2013.01); *H04L 67/18* (2013.01); *H04W 4/185* (2013.01); *H04L 67/02* (2013.01); *H04L 67/22* (2013.01)

(58) Field of Classification Search
 CPC ......... G06F 17/30864; G06F 17/30867; G06F 17/3063; G06F 17/30241; G06Q 30/02; G06Q 30/0241
 See application file for complete search history.

(56) References Cited

U.S. PATENT DOCUMENTS

| 6,763,496 | B1 * | 7/2004 | Hennings .......... G06F 17/30899 707/E17.119 |
| 7,302,425 | B1 * | 11/2007 | Bernstein .......... G06F 17/30457 |
| 8,028,227 | B1 | 9/2011 | Mahan et al. |
| 8,150,824 | B2 * | 4/2012 | Marmaros ......... G06F 17/30882 707/706 |
| 2001/0047393 | A1 * | 11/2001 | Arner et al. .................. 709/216 |

(Continued)

FOREIGN PATENT DOCUMENTS

EP    2498054 A1    9/2012

OTHER PUBLICATIONS

Bottaro et al., "Visual Programming of Location-Based Services", In Proceedings of the 2011 International Conference on Human interface and the management of information—vol. Part I, HCII 2011, LNCS 6771, Springer-Verlag, Berlin, Heidelberg, pp. 3-12.

(Continued)

*Primary Examiner* — Cam-Y Truong
(74) *Attorney, Agent, or Firm* — Ditthavong & Steiner, P.C.

(57) ABSTRACT

An approach is provided for associating physical locations to websites. The element platform may determine one or more user interactions by at least one user with at least one user interface element embedded in at least one website of at least one online entity, wherein the at least one user interface element is associated with one or more physical locations of the at least one online entity. Then, the element platform may cause, at least in part, a storage of the one or more physical locations in at least one user collection database based, at least in part, on the one or more interactions.

19 Claims, 14 Drawing Sheets

(56) References Cited

U.S. PATENT DOCUMENTS

| | | | |
|---|---|---|---|
| 2003/0033176 A1* | 2/2003 | Hancock | G01C 21/20 |
| | | | 705/6 |
| 2003/0036848 A1* | 2/2003 | Sheha | G01C 21/3679 |
| | | | 701/468 |
| 2006/0069503 A1* | 3/2006 | Suomela | G01C 21/3641 |
| | | | 701/431 |
| 2006/0101341 A1* | 5/2006 | Kelly | G06F 17/30899 |
| | | | 715/738 |
| 2007/0213039 A1 | 9/2007 | Skog | |
| 2009/0100342 A1 | 4/2009 | Jakobson | |
| 2009/0164612 A1* | 6/2009 | Lee | H04L 12/66 |
| | | | 709/222 |
| 2009/0176509 A1 | 7/2009 | Davis et al. | |
| 2010/0017703 A1* | 1/2010 | Glickman et al. | 715/234 |
| 2010/0131366 A1 | 5/2010 | Gibson et al. | |
| 2010/0302143 A1 | 12/2010 | Spivack | |
| 2011/0055765 A1* | 3/2011 | Neubrand | H04N 1/00204 |
| | | | 715/838 |
| 2012/0079284 A1* | 3/2012 | Takatani | G06F 11/1456 |
| | | | 713/189 |
| 2012/0159371 A1* | 6/2012 | Thrapp | G06F 17/30241 |
| | | | 715/772 |
| 2012/0323704 A1* | 12/2012 | Steelberg | G06Q 30/0268 |
| | | | 705/14.73 |
| 2013/0073387 A1 | 3/2013 | Heath | |
| 2014/0136615 A1* | 5/2014 | Li | 709/204 |

OTHER PUBLICATIONS

Hansen et al., "Integrating the Web and the World: Contextual Trails on the Move", In Proceedings of the 15th ACM International Conference of Hypertext and Hypermedia (Hypertext 2004). ACM Press, New York (2004), pp. 98-107.

PCT International Search Report corresponding to Application No. PCT/EP2014/068458, mailed Dec. 22, 2014, 5 pages.

Notification of Transmittal of Translation of the International Preliminary Report on Patentability (Chapter I or Chapter II) along with Written Opinion of the International Searching Authority for International Application No. PCT/EP2014/068458, mailed Dec. 22, 2014, 7 pages.

* cited by examiner

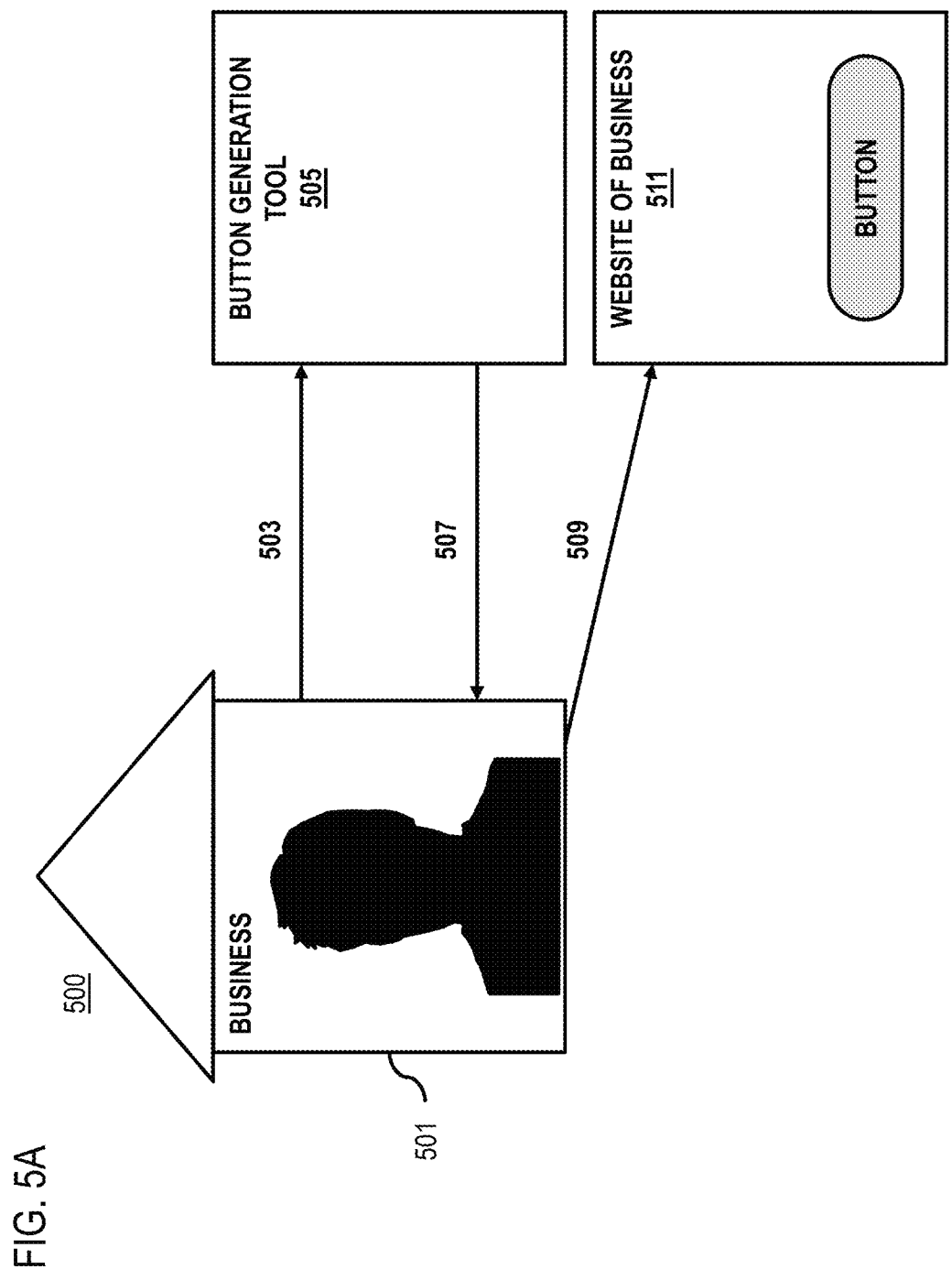

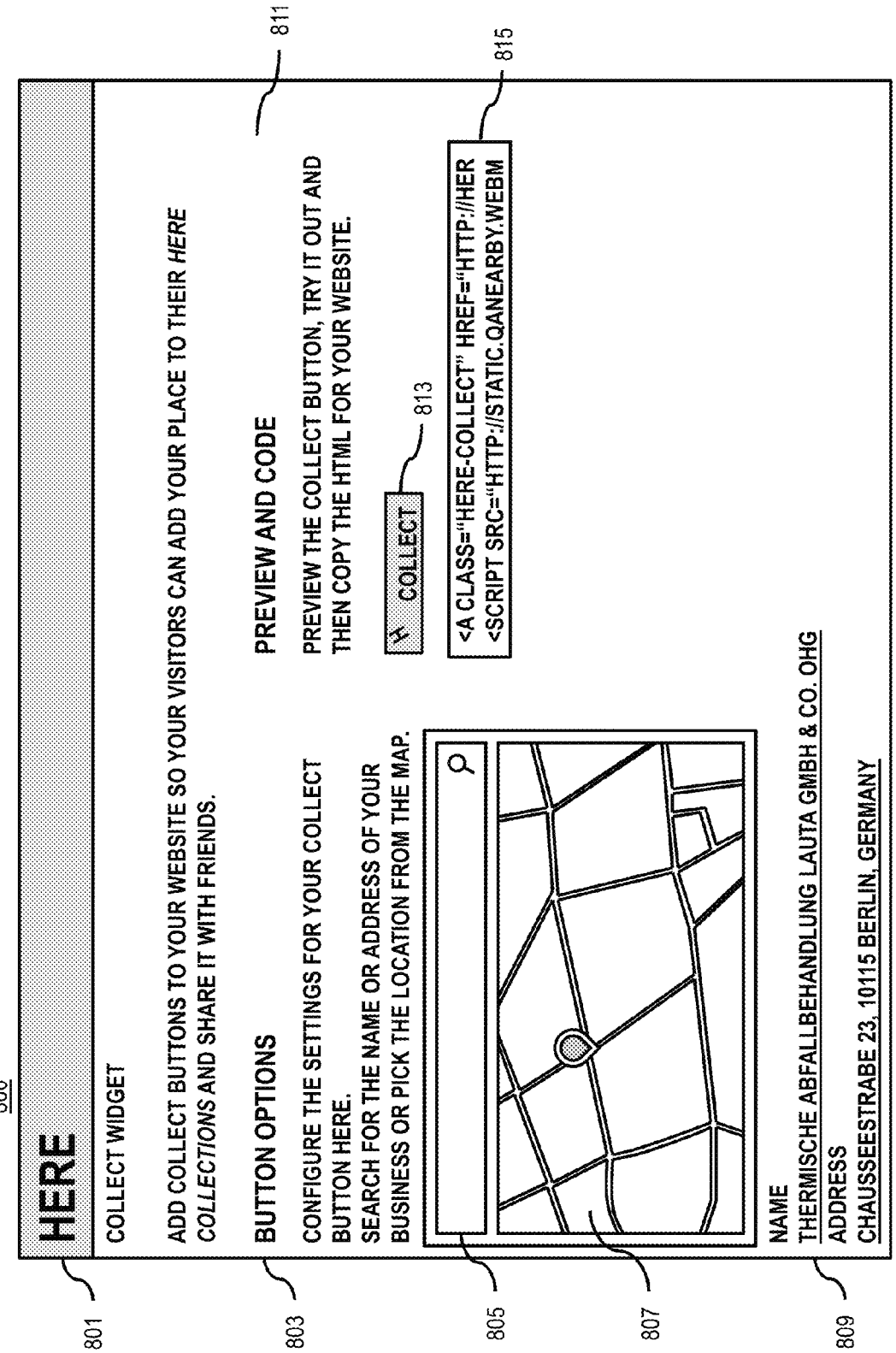

METHOD AND APPARATUS FOR ASSOCIATING PHYSICAL LOCATIONS TO ONLINE ENTITIES

BACKGROUND

Service providers and device manufacturers (e.g., wireless, cellular, etc.) are continually challenged to deliver value and convenience to consumers by, for example, providing compelling network services. One area of interest has been the development of offering point of interest location and navigation information. For example, businesses often have associated location information. The address of a physical store of a business may be such location information. The businesses may provide this information via a website. However, websites often do not have physical location information that may be automatically directed to user storage. For example, a business owner may visually show a map location of his business. Users may then manually save the location information. For example, users may look up addresses from map providers and manually save address information or send it to a personal device. Therefore, content providers face challenges in offering a link between user storage and physical location information of virtual entities (e.g., websites).

SOME EXAMPLE EMBODIMENTS

Therefore, there is a need for an approach for associating physical locations to websites.

According to one embodiment, a method comprises determining one or more user interactions by at least one user with at least one user interface element embedded in at least one website of at least one online entity, wherein the at least one user interface element is associated with one or more physical locations of the at least one online entity. The method also comprises causing, a least in part, a storage of the one or more physical locations in at least one user collection database based, at least in part, on the one or more interactions.

According to another embodiment, an apparatus comprises at least one processor, and at least one memory including computer program code for one or more computer programs, the at least one memory and the computer program code configured to, with the at least one processor, cause, at least in part, the apparatus to determine one or more user interactions by at least one user with at least one user interface element embedded in at least one website of at least one online entity, wherein the at least one user interface element is associated with one or more physical locations of the at least one online entity. The apparatus is also caused to cause, a least in part, a storage of the one or more physical locations in at least one user collection database based, at least in part, on the one or more interactions.

According to another embodiment, a computer-readable storage medium carries one or more sequences of one or more instructions which, when executed by one or more processors, cause, at least in part, an apparatus to determine one or more user interactions by at least one user with at least one user interface element embedded in at least one website of at least one online entity, wherein the at least one user interface element is associated with one or more physical locations of the at least one online entity. The apparatus is also caused to cause, a least in part, a storage of the one or more physical locations in at least one user collection database based, at least in part, on the one or more interactions.

According to another embodiment, an apparatus comprises means for determining one or more user interactions by at least one user with at least one user interface element embedded in at least one website of at least one online entity, wherein the at least one user interface element is associated with one or more physical locations of the at least one online entity. The apparatus also comprises means for causing, a least in part, a storage of the one or more physical locations in at least one user collection database based, at least in part, on the one or more interactions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A and 5B are diagrams of use cases, in one embodiment;

FIGS. 8, 9A, and 9B are diagrams of user interfaces utilized in the processes of FIG. 3, according to various embodiments;

DESCRIPTION OF SOME EMBODIMENTS

Examples of a method, apparatus, and computer program for associating physical locations to websites are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
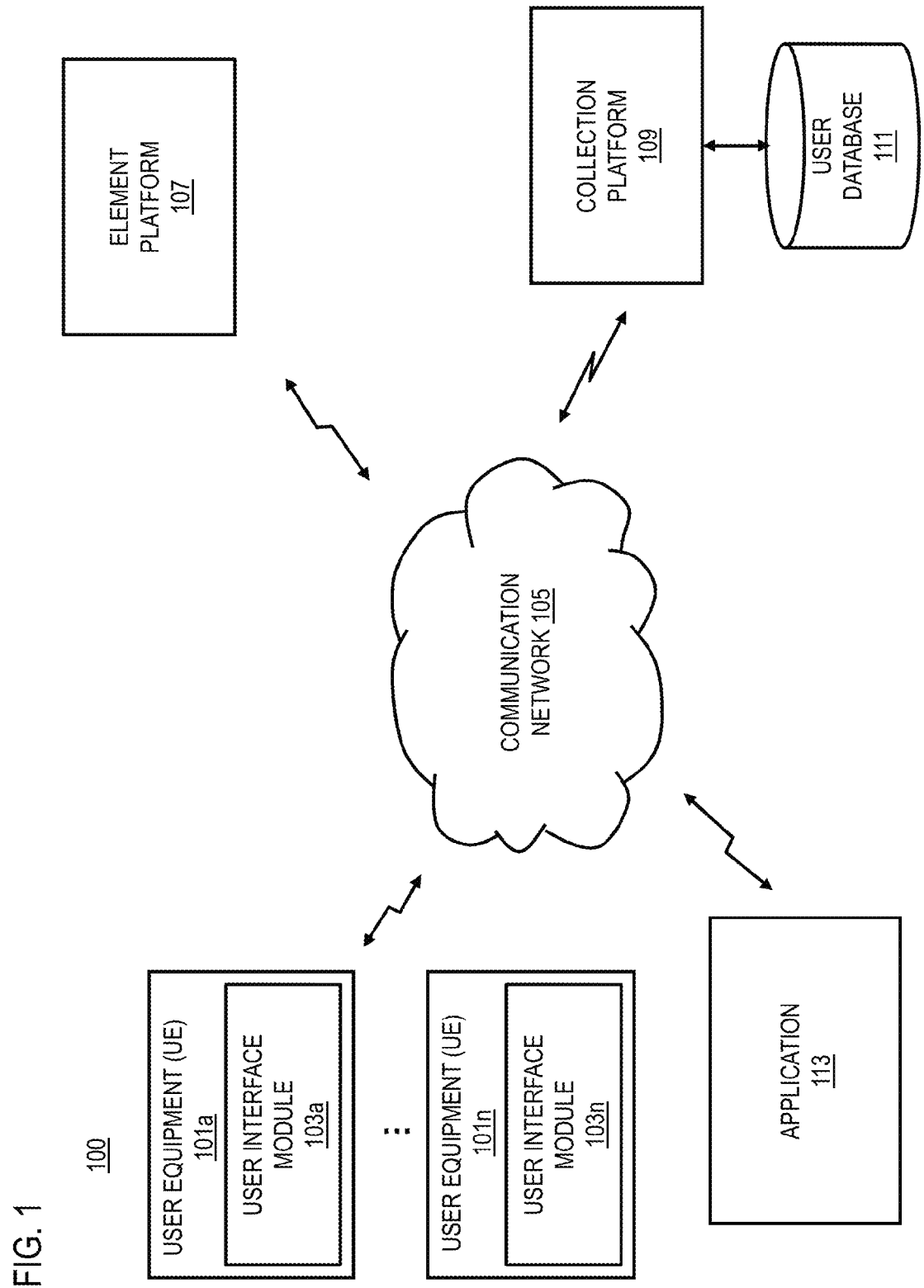
FIG. 1 is a diagram of a system capable of associating physical locations to websites, according to one embodiment.

FIG. 1 is a diagram of a system capable of associating physical locations to websites, according to one embodiment. Service providers and device manufacturers (e.g., wireless, cellular, etc.) are continually challenged to deliver value and convenience to consumers by, for example, providing compelling network services. One area of interest has been the development of offering point of interest location and navigation information. For example, businesses often have associated physical location information so that consumers may easily find and navigate to the businesses. However, even if businesses show the location information on their websites, users visiting the website must manually save the location information. For example, a user may copy the location information and manually store it to her device or retrieve the location information from a map provider and store it to her device. The virtual entity of the business is not linked to its physical location. Therefore, content providers (e.g., businesses) face challenges linking their physical presence with their virtual presence.

To address this problem, a system 100 of FIG. 1 introduces the capability to associate physical locations to websites. For example, a business owner may have a virtual presence (e.g., a website) and wish to attach a physical location to the virtual presence. The business owner may create the location information for the physical location and the system 100 may determine a request from the business owner to create a user interface element. Upon determining the request, system 100 may generate a computer code incorporating the location information from the business owner. Then, system 100 may create a user interface element such that a user interacting with the user interface element may collect the location information attached to the computer code.

In one embodiment, the business owner (or any user associated with a virtual presence) may create the location information, for example, by searching for the location information online, picking the location from a map, associating the location with one or more devices equipped with Global Positioning System (GPS) capability, entering in the location, or a combination thereof. In one embodiment, location information may include latitude/longitude coordinates, mapping, routing, timetable information, or a combination thereof. In one embodiment, the owner may include information other than (or in addition to) the location information to be available to users via the user interface element. For example, the computer code may further include names, address, description of the business or website, graphics, media, etc. In one embodiment, the owner may interact directly with a component of system 100 to generate the location information for the user interface element. In another embodiment, the owner may interact with an intermediary service that triggers system 100 to activate and assemble the user interface element based on information from an owner. For example, the intermediary service may include a service that helps the owner build the website for his business.

In one embodiment, the system 100 generates a user interface element to receive user interaction with the computer code containing information from the owner. In one embodiment, a user may collect the information from the owner by interacting with the user interface element. For example, the system 100 may determine that a user has clicked on the user interface element. Then, the system 100 may extract or retrieve location information from the computer code associated with the user interface element. In one embodiment, the system 100 may then store the location information to an account associated with the user who clicked on the user interface element. For example, the user may have a "Collected" folder containing the location information associated with any website whose user interface element was clicked by the user.

In one embodiment, the system 100 may provide the Collected folder on any device or virtual entity (e.g., a web browser or online account) associated with the user. In a further embodiment, the system 100 may require authorization or authentication of the user's identity prior to permitting the user to "collect" a piece of location information to a Collected folder. In yet another further embodiment, the system 100 may permit the user to select which devices are associated with the Collected folder, or which device's Collected folder is updated with a new piece of location information. For instance, when a user clicks on the user interface element, system 100 may provide the user with a drop-down list of the devices associated with the user. Then, the system 100 may forward the location information associated with the user interface element to the device(s) selected by the user such that only Collected folder associated with the selected device(s) receive that particular location information.

In a further embodiment, the system 100 may alter the user interface element based, at least in part, on the user interaction. For example, the system 100 may generate a user interface element as a button. Initially, the button may read, "Collect." Once a user has clicked on the button to collect the embedded location information, the button may read, "Collected." Alternately, the color, shape, or size of the button may change. The system 100 may employ any change in the appearance of the user interface element to indicate to the user whether or not information associated with the website is already in the user's Collected folder(s). In one embodiment, the system 100 may further display collection information with the user interface element. For instance, the user interface element may show how many other users have already collected the information, if any users associated with the user have collected, etc. Users associated with the user may include contacts of the user as shown by the user's phonebook, social networks, geographic location, age, etc. In one embodiment, the system 100 may determine if a user has already collected by accessing information from a user account. Then, the system 100 may display the user interface element according to collection history from the user account when loading a website. In a further embodiment, the system 100 may prompt a user to log into a user account either prior to loading the website or after loading a website.

In one embodiment, the system 100 may account for multiple locations associated with a virtual presence by providing options to select which location information to collect. For example, the system 100 may present a user interface element for each location information. One such scenario may include a store with multiple locations. Below each location, system 100 may present a "Collect" button as the user interface element where user interaction with the Collect button will store only the location information associated with the store location immediately above the Collect button. In another example, the system 100 may present a user interface element with a drop-down list of the location information so that a user may select location information to collect, from a single element.

In another embodiment, the system 100 may update and/or notify owners to update location information. For example, virtual presences may include websites for moving entities. Moving entities may include, for instance, food trucks. Then, users who are customers may wish to follow the locations of the food trucks. In one instance, system 100 may automatically update location information associated with the virtual presence. In one scenario, the system 100 may present a new "Collect" button even if a user has already collected before, since the location information may now be different from the user's previously collected location information. In another scenario, system 100 may automatically update information in users' Collected folders when location information changes in the sources from which the information was collected. In yet another scenario, system 100 may associate a GPS-enabled device (or owner) with location information associated with a virtual presence. When a change is detected in the GPS information from the device or owner, system 100 may automatically update location information (at the user interface element, Collected folders, etc.), prompt an owner to update location information associated with the user interface element, prompt an owner to approve or verify an update, or a combination thereof.

As shown in FIG. 1, the system 100 comprises a user equipment (UE) 101a-101n (or UEs 101) having connectivity to user interface modules 103a-103n (or user interface modules 103), element platform 107, collection platform 109, user database 111, and application 113 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, user interface modules 103 may provide information regarding user interaction with the user interface elements. For example, users may interact with user interface elements via user interface modules 103. User interface modules 103 may further provide authorization or user authentication granting access to store location information of physical locations. In another embodiment, settings for various functions in system 100 may occur through user interface modules 103. For example, user interface modules 103 may include settings regarding devices a user may want to allow access to his collected physical locations, how he would like user interface elements to appear to him, what level of authentication is required for access, how collected information is displayed, or a combination thereof. For instance, devices a user may want to allow access to may include letting a user dictate whether to allow his mobile phone, car, and computer access to his database of collected physical locations. How a user may want a user interface element to appear may include, for instance, whether a user wants to display how many people have previously collected from the website. Level of authentication may permit a user to allow different layers of security, for instance, whether an additional security prompt should appear prior to actually extracting and storing location information. How collected information is displayed may include, for example, the sorting order of location information. For instance, physical locations may be sorted by relevance, date of collection, proximity to a user position, etc.

In one embodiment, the element platform 107 may generate the user interface elements. For example, element platform 107 may receive location information and create a user interface element that would permit collection of the location information. For instance, the element platform 107 may generate a computer code with the location information embedded in the computer code. For example, element platform 107 may create a HyperText Markup Language (HTML) code including latitude and longitude coordinates. Then, the element platform 107 may create a user interface element embeddable in a virtual entity (e.g. a website) such that the code is accessible to users who visit the website. As previously discussed, the code (and by extension the user interface element) may be associated with information in addition to location information.

In one embodiment, the collection platform 109 may determine user interaction with user interface elements and initiate extraction of location information from the code associated with respective user interface elements. For example, the collection platform 109 may determine a user account and authorization of access to a database associated with the user account. The collection platform 109 may also control the sharing of the extracted location information. For example, the collection platform 109 may notify a social network associated with a user account that the location information has been collected. The collection platform 109 may also permit a user to determine what devices or services may access the database of collected location information.

In one embodiment, the user database 111 may maintain a user's collected information. For example, the user database 111 may update locations and send updated information to the collection platform 109. The collection platform 109 may then update the location information at the user database. In addition, the user database 111 may prompt the element platform 107 to change the user interface element code to reflect the new location information, and perhaps, change the user interface element itself to prompt a new collection action from a user. In a further embodiment, the user database 111 may determine where location information is expired. For example, a business may close and a website may go defunct. The user database 111 may track such changes and update location information accordingly so that data in the user database 111 is up to date and accurate. In yet another further embodiment, the user database 111 may continually organize its collection for retrieval or organization that reflects a user's usage of the information. This may contribute to displays of collections of the physical locations that are most relevant and current to users.

In one embodiment, the application 113 may serve as the means by which the UEs 101, element platform 107, and collection platform 109 interact. For example, the application 113 may prompt action between the UEs 101, element platform 107, collection platform 109, and user database 111 when there is an update in location information. For instance, the application 113 may cause the element platform 107 to update the code in the embedded button, cause the collection platform 109 to access a user account (and user database 111) to change the location information in the user database 111, and notify the UEs 101 of the change. In another instance, the application 113 may simply cause the element platform 107 to generate a new code and contact the UEs 101 to re-collect the information.

By way of example, the UEs 101, the user interface modules 103, element platform 107, collection platform 109, user database 111, and application 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2A:
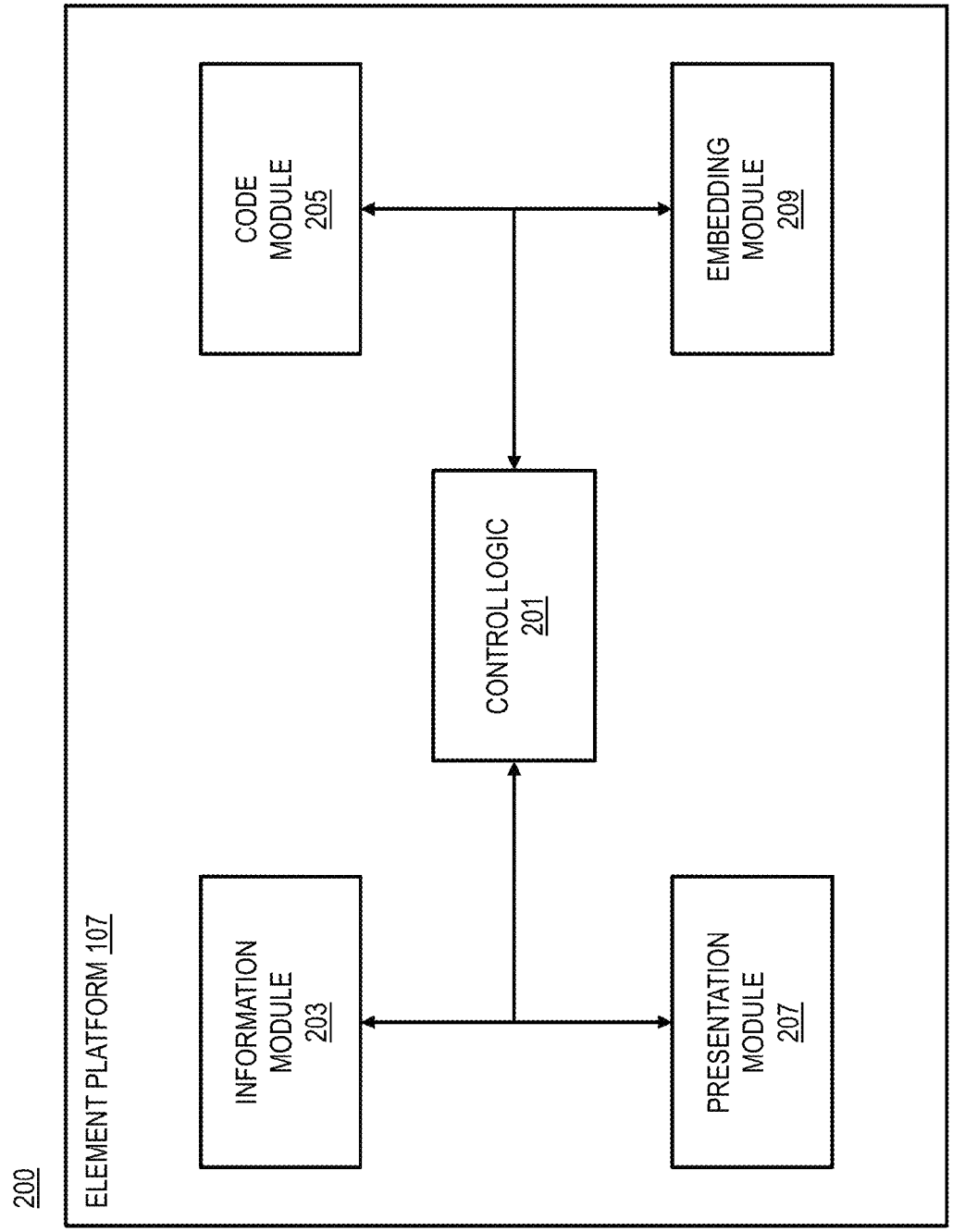
FIG. 2A is a diagram of the components of an element platform, according to one embodiment.

FIG. 2A is a diagram 200 of the components of the element platform 107, according to one embodiment. By way of example, the element platform 107 includes one or more components for associating physical locations to websites. It is contemplated that the functions of these components may be combined in one or more components or performed by other components of equivalent functionality. In this embodiment, the element platform 107 includes a control logic 201, an information module 203, a code module 205, a presentation module 207, and an embedding module 209.

In one embodiment, the control logic 201 and information module 203 may obtain information owners wish to be collectible to users from their websites. For example, the control logic 201 and information module 203 may prompt website owners to select location information from a map and/or a listing. The control logic 201 and information module 203 may further prompt website owners to assemble packages of information including a latitude-longitude pair for the location information, as well as an address, title, and identifier. For example, the identifier may include a unique identifier associated with a physical place. Furthermore, the package of information may include details, for example, descriptive text or media.

In one embodiment, the control logic 201 and the code module 205 may create a code for the location information and/or package of information. For instance, the control logic 201 and code module 205 may create a descriptive code snippet containing the location information and/or package of information. In another embodiment, the control logic 201 and code module 205 may simply permit retrieval of the location information and/or package of information without directly containing the location information and/or package of information.

In one embodiment, the control logic 201 and presentation module 207 may create a user interface element from which a user may interact with the code created by the control logic 201 and code module 205. For instance, the control logic 201 and presentation module 207 may create a button that a user may click on from a website. In one embodiment, the control logic 201 and presentation module 207 may modify the user interface element based on user interaction. For instance, the control logic 201 and presentation module 207 may change the appearance or a caption on the user interface element from "Collect" to "Collected" when a user interacts with the user interface element. Another instance of changing the user interface element may include increasing a user interface element's size as more a user's friends or social contacts have collected information using the user interface element or offering a counter showing how many total users have collected information from the user interface element.

In one embodiment, the control logic 201 and embedding module 209 may embed the user interface element in a website. For example, the control logic 201 and embedding module 209 may permit the insertion of the user interface element in any location on a website. Alternately, the control logic 201 and embedding module 209 may embed the user interface element in a standardized location. For instance, the control logic 201 and embedding module 209 may always insert the user interface element in a toolbar, menu, or upper right hand corner of a website. In one embodiment, the control logic 201 and embedding module 209 may permit the owner to configure settings to control how the control logic 201 and embedding module 209 inserts the user interface element into a website.

Figure 2B:
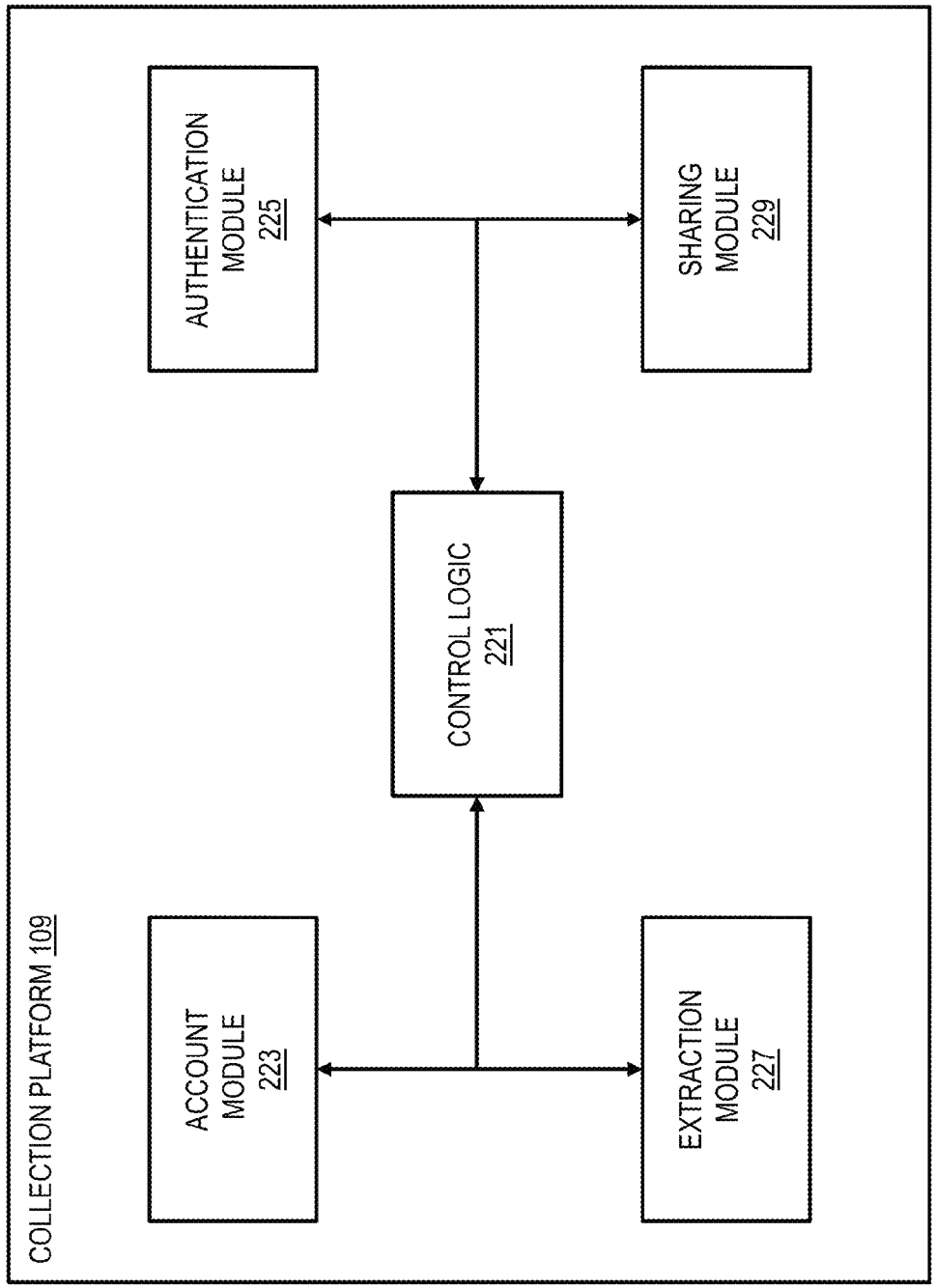
FIG. 2B is a diagram of the components of a collection platform, according to one embodiment.

FIG. 2B is a diagram 220 of the components of the collection platform 109, according to one embodiment. By way of example, the collection platform 109 includes one or more components for extracting physical locations from user interface elements. It is contemplated that the functions of these components may be combined in one or more components or performed by other components of equivalent functionality. In this embodiment, the collection platform 109 includes a control logic 221, an account module 223, an authentication module 225, an extraction module 227, and a sharing module 229.

In one embodiment, the control logic 221 and account module 223 may detect an interaction with a user interface element and determine a device (and user) associated with the interaction. Alternately, the control logic 221 and account module 223 may identify a user account while loading a website. Based on information associated with the account, the control logic 221 and account module 223 may communicate with the element platform 107 to determine a rendering of the user interface element. In one embodiment, the control logic 221 and account module 223 may further supply the collection platform 109 with information regarding users who are collecting the location information. For example, the control logic 221 and account module 223 may determine that 25 users have collected the location information in a given day when a business first started advertising. In another instance, the control logic 221 and account module 223 may determine that users who are collecting the location information are predominantly students, or predominantly females. This information may be useful for business owners or the collection platform 109 as a service.

In one embodiment, the control logic 221 and authentication module 225 may activate if interaction is detected with a user interface element from a device without an account detected by the element platform 107. In one embodiment, the control logic 221 and authentication module 225 may request authorization and/or authentication from a user for a respective user account prior to extracting information to save to the user's account. In one embodiment, the control logic 221 and authentication module 225 may include various settings or variations of authorization for different accounts. For example, a user may include a public account where control logic 221 and authentication module 225 require minimal authorization for storage access. In another embodiment, a user may have a high-security account where a user may have to enter additional levels of authorization to store location information to the user collection database.

In one embodiment, the control logic 221 and extraction module 227 may extract the location information (and/or package of information created by the owner). In one embodiment, the control logic 221 and extraction module 227 may extract the location information and store the information to a user account as indicated by the control logic 221, account module 223, and authentication module 225. In another embodiment, the control logic 221 and extraction module 227 may simply extract the information and rely on direction from the control logic 221 and sharing module 229 to determine where to direct the extracted information. In one instance, the control logic 221 and extraction module 227 may extract only a subset of the information available from the user interface element. Such a case may rely on user configuration or settings. In another instance, the control logic 221 and extraction module 227 may present a preview of the extracted information prior to storing it.

In one embodiment, the control logic 221 and sharing module 229 may determine where to store extracted information. For example, the control logic 221 and sharing module 229 may store the information to a user account. In another example, the control logic 221 and sharing module 229 may store the information to a collective user account and/or a social network. In yet another example, the control logic 221 and sharing module 229 may store the information to one or more devices as selected by a user.

Figure 3:
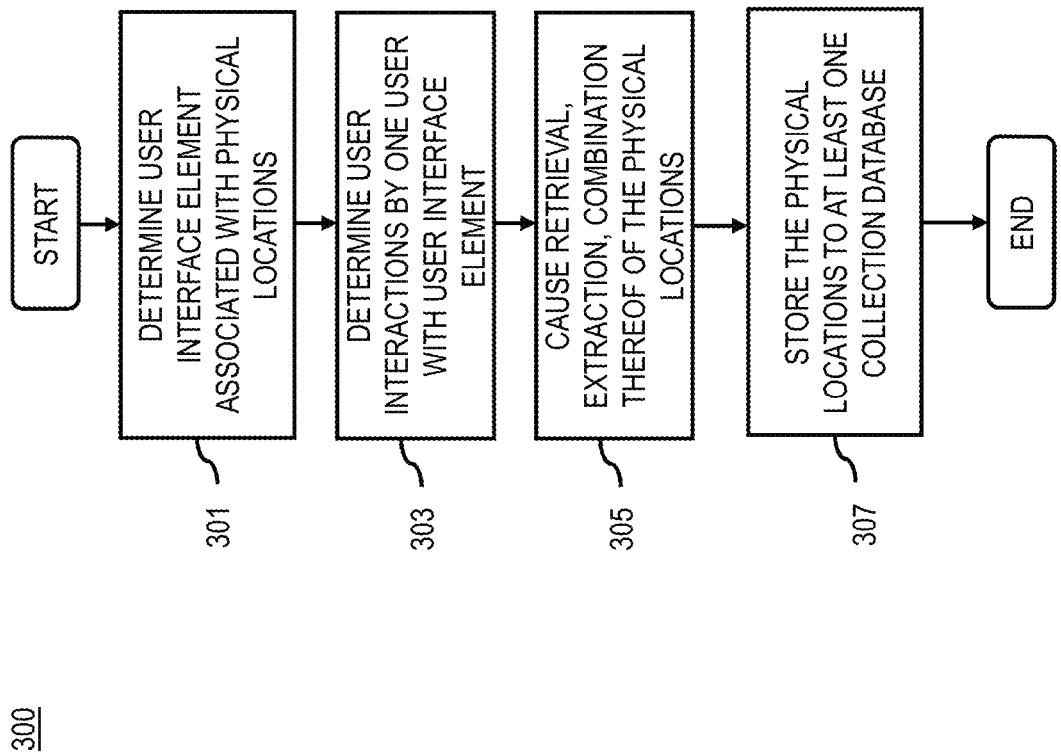
FIG. 3 is a flowchart of a process for associating physical locations to websites, according to one embodiment.
Figure 11:
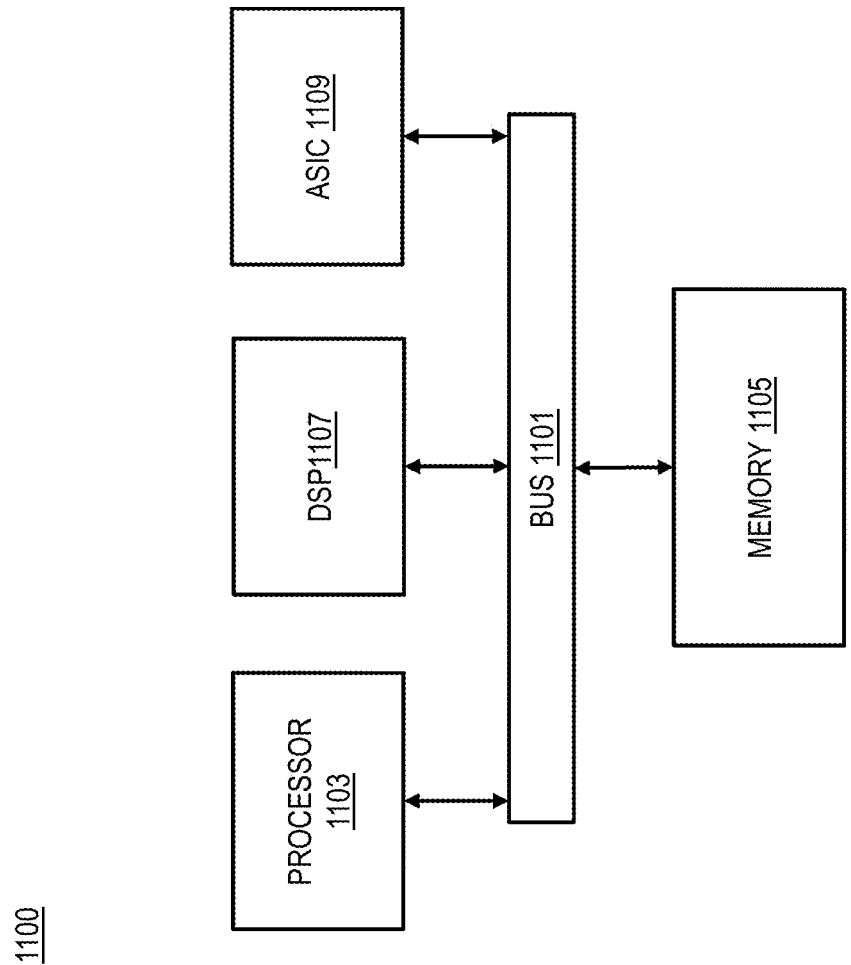
FIG. 11 is a diagram of a chip set that can be used to implement an embodiment of the invention.

FIG. 3 is a flowchart of a process for associating physical locations to websites, according to one embodiment. In one embodiment, the collection platform 109 performs the process 300 and is implemented in, for instance, a chip set including a processor and a memory as shown in FIG. 11. In one embodiment, the control logic 221 may determine one or more user interactions by at least one user with at least one user interface element embedded in at least one website of at least one online entity, wherein the at least one user interface element is associated with one or more physical locations of the at least one online entity (step 301 and step 303). In one embodiment, the one or more physical locations include, at least in part, latitude, longitude, address information, title information, identification information, descriptive information, or a combination thereof. For example, the one or more physical locations may include physical geographical coordinates associated with one or more items in a database. For instance, the one or more items in a database may include point of interest in a service provider database. The one or more physical locations may also include navigational or route information or any type of supplemental information. In one embodiment, the online entity includes, at least in part, a website, a blog, a magazine, an internet portal, or a combination thereof. The online entity may be any virtual presence, for instance, a website for a store.

In one embodiment, the control logic 221 may cause, at least in part, a storage of the one or more physical locations in at least one user collection database based, at least in part, on the one or more user interactions (step 305 and step 307). For example, step 305 may include wherein the at least one user interface element includes, at least in part, computer code data and processing and/or facilitating a processing of the computer code data to cause, at least in part, a retrieval, an extraction, or a combination thereof of the one or more physical locations. In one embodiment, the control logic 221 may further cause, at least in part, a creation of the computer code data based, at least in part, on the one or more physical locations. For example, the computer code data may include a descriptive code snippet that would allow for identification of the physical locations. In a further embodiment, the retrieval or extraction of physical locations may include a unique identifier associated with the physical location. The identifier may be pre-generated or generated with the code. In one embodiment, the storing of the one or more physical locations may cause the locations to be available from multiple other user resources. For example, step 307 may include causing, at least in part, access to the at least one user collection database to one or more applications, one or more other websites, or a combination thereof. In other words, step 307 may include associating a user identifier with the identifier for the physical location.

In one embodiment, the retrieval and/or extraction may be contingent on authorization from a user to store information to his user collection database. For instance, step 305 may include the control logic 221 causing, at least in part, a receipt of user account information, authorization to access the one or more user accounts, or a combination thereof. For example, the control logic 221 may prompt a request for a user to log in. In one embodiment, the control logic 221 may then cause, at least in part, the access to the at least one user database to the one or more applications, one or more other websites, or a combination thereof based, at least in part, on the user account information, authorization to access one or more user accounts, or a combination thereof.

Figure 4:
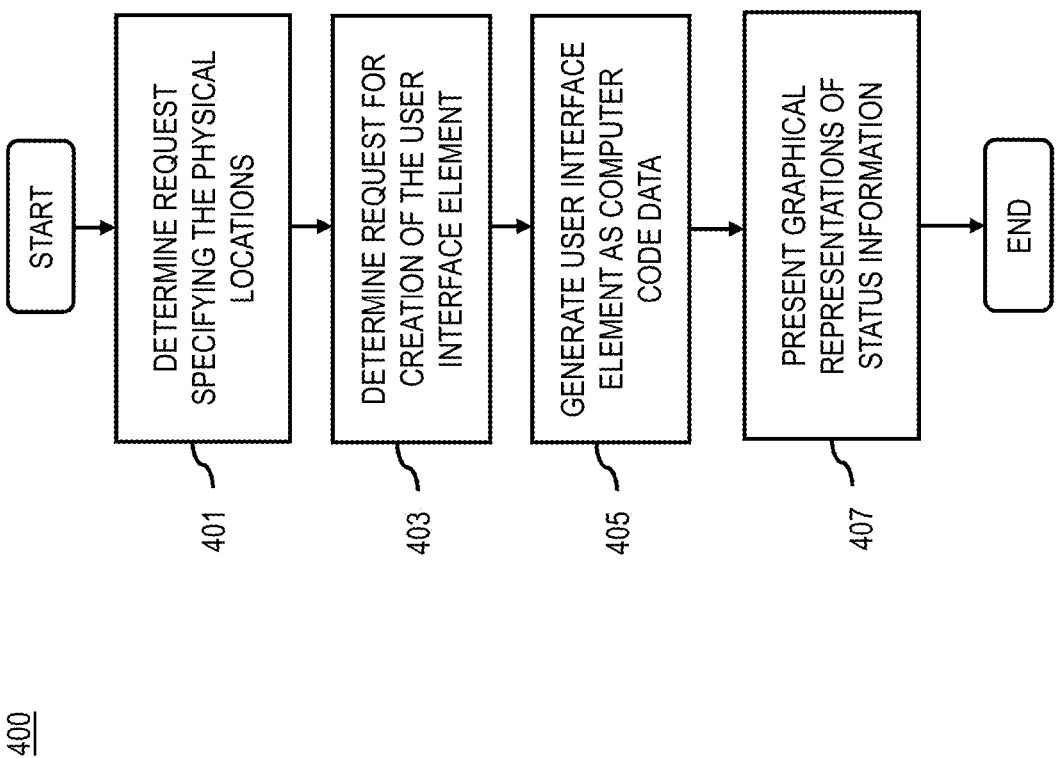
FIG. 4 is a flowchart of a process for creating the user interface element, according to one embodiment.

FIG. 4 is a flowchart of a process for creating the user interface element, according to one embodiment. In one embodiment, the element platform 107 performs the process 400 and is implemented in, for instance, a chip set including a processor and a memory as shown in FIG. 11. In one embodiment, the control logic 201 may determine a request from the at least one online entity for creation of the a least one user interface element, wherein the request specifies, at least in part, the one or more physical locations (step 401 and step 403). For example, a website owner may request, from a service, to create a collection button for his website. Then, the control logic 201 may cause, at least in part, a generation of the at least one user interface element as a computer code data that (1) includes the one or more physical locations as extractable data; (2) provides computer instructions for retrieving the one or more physical locations from at least one location database; or (3) a combination thereof (step 405). In one embodiment, the control logic 201 may cause, at least in part, a presentation of one or more graphical representations of status information with respect to the one or more user interactions, the storage of the one or more physical locations in the at least one user collection database, or a combination thereof (step 407). For example, the graphical representations may include a counter showing how many times location information has already been collected from the website. In one embodiment, the control logic 201 may cause a presentation of representations wherein the presentation of the one or more graphical representations includes one or more modifications to the at least one user interface element.

Figure 5B:
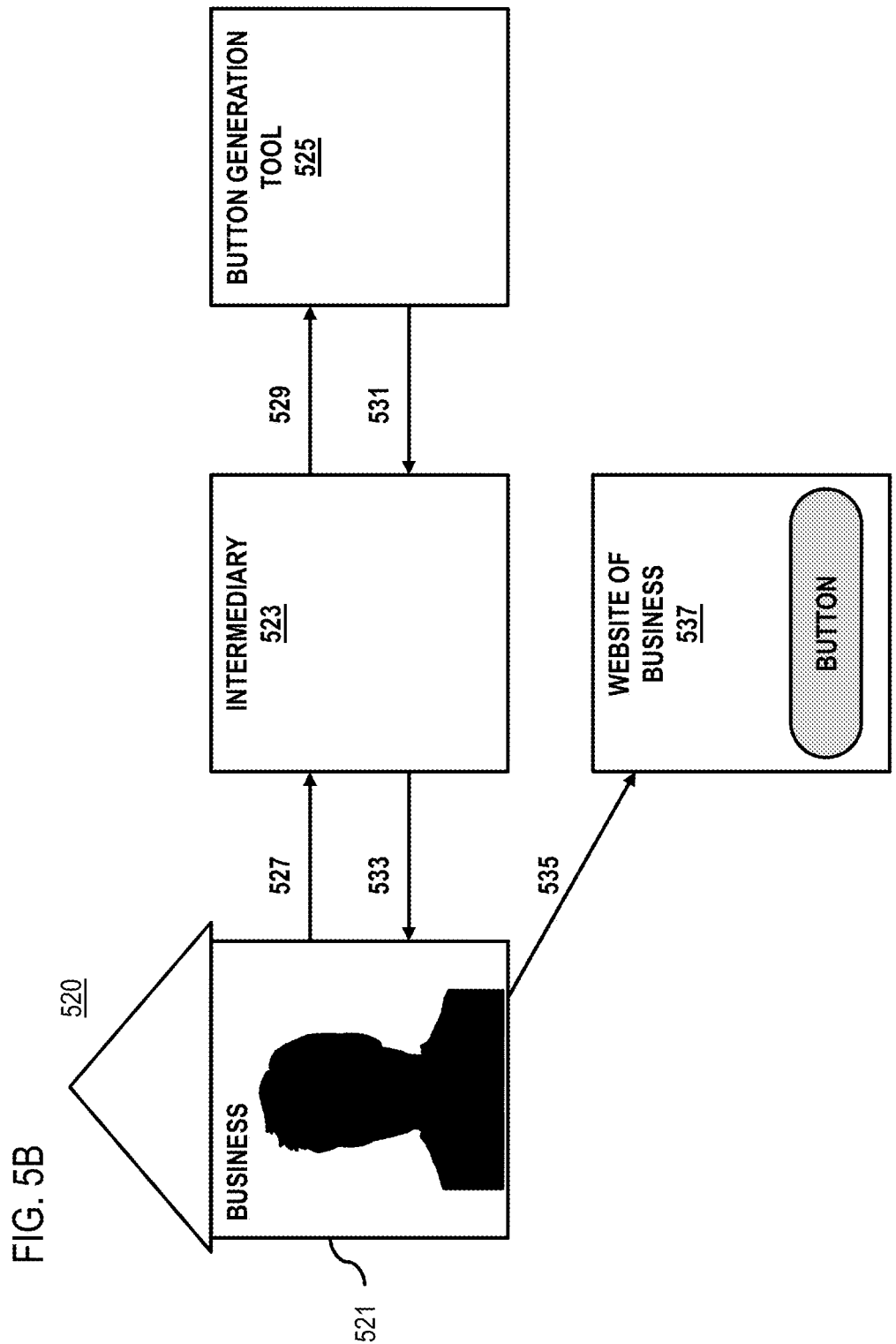

FIGS. 5A and 5B are diagrams of use cases with system 100, in one embodiment. FIG. 5A shows a process 500 by which an owner or online entity may use the element platform 107. In one embodiment, the process 500 may involve a business 501 acting on step 503 of contacting a button generation tool 505. In one embodiment, step 503 may include the business 501 providing the button generation tool 505 with details regarding location information, a description of the business, an address, a title, etc. For example, information from the business 501 may include information from a database. In one scenario, a point of interest database may provide the location information.

In one embodiment, the button generation tool 505 may then perform step 507, generating a code including information provided by the business 501. For example, the code may associate a physical location with latitude and longitude coordinates, with a point of interest associated with the business 501. In one case, the point of interest associated with the business 501 may be part of a point of interest database. In one instance, step 507 may further include the button generation tool 505 creating a place identifier specific to the information provided by the business 501 in step 503. For instance, the identifier may later be used to identify and/or detect the information, for example, to determine whether a user has already collected the information. In a further embodiment, step 507 may include the button generation tool 505 creating a user interface button that may activate extraction of the business owner's information from the code. Then, the business 501 may perform step 509, adding the code (and button) to his website 511.

FIG. 5B shows an alternative process 520 where a business 521 may interact with an intermediary 523, rather than communicating directly with button generation tool 525, in one embodiment. For instance in step 527, the business 521 may visit the intermediary 523, where the intermediary 523 provides a service in facilitating development of the business owner's online entity. In one embodiment, the intermediary 523 may perform step 529, contacting the button generation tool 525. In one embodiment, the intermediary 523 may provide the button generation tool 525 with location information (and/or additional information), for example, information associated with the business 521 in a database. Then, the button generation tool 525 may perform step 531, creating a code including the information and generating a button by which visitors to the business's online entity may access the code (and information). With step 533, the intermediary 523 may provide the business 521 with the code and button. For example, the intermediary 523 may offer the business 521a preview of the button and/or an opportunity to verify the code and information. With step 535, the business 521 may embed the button to his web site 537.

Figure 6:
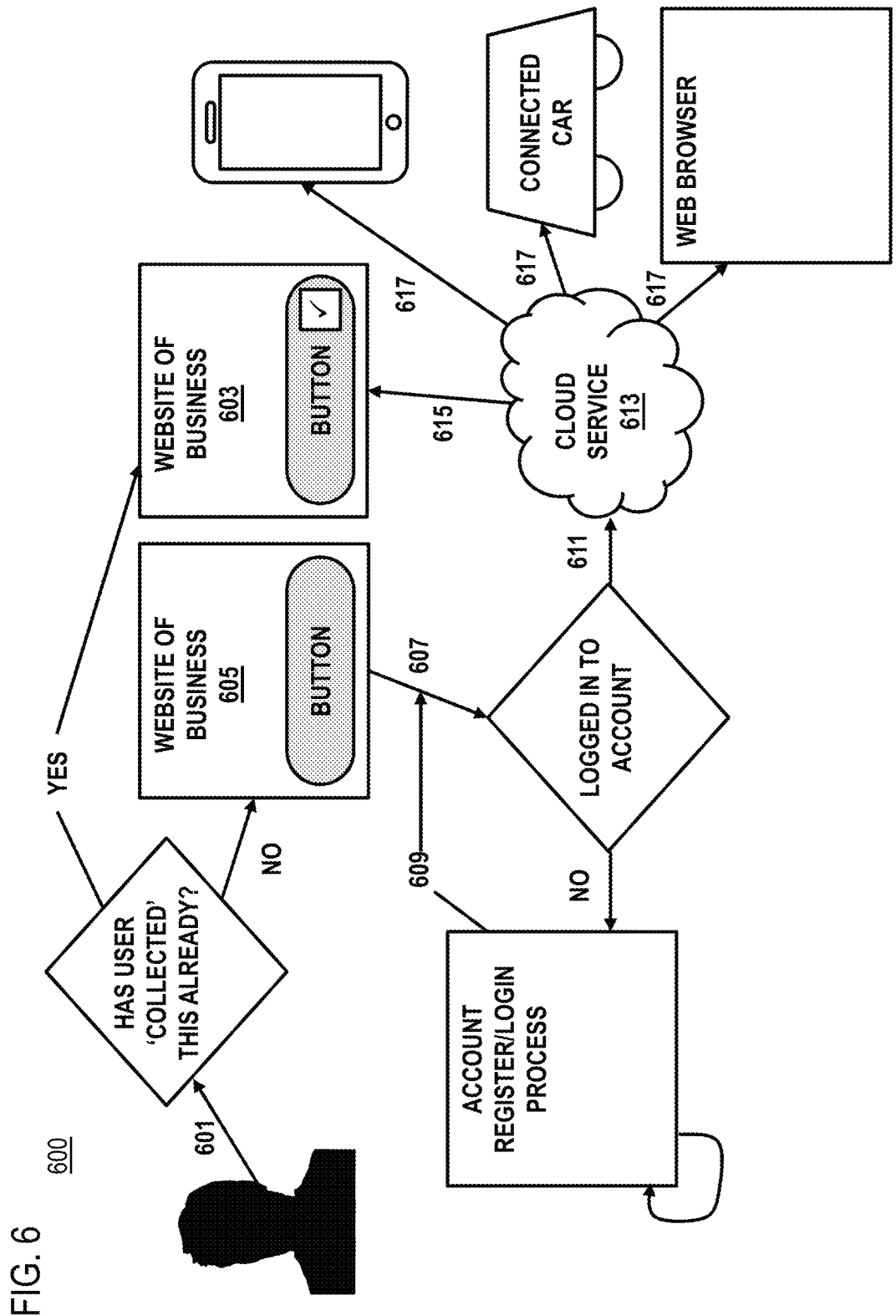
FIG. 6 is a diagram of user interaction with a user interface element, in one embodiment.

FIG. 6 is a diagram 600 of user interaction with a user interface element, in one embodiment. In step 601 of loading a website from an owner, system 100 may determine if a user has already collected location information associated with the website. If so, system 100 may show website 603 with a button indicating the past collection. If not, the system 100 may show website 605 with a button showing that collection is available. In a further embodiment, website 605 may show, for example, a tally of the number of other users that have already collected from the website 605. In one embodiment, system 100 may proceed to step 607 of determining whether a user is logged into an account. If not, system 100 may engage step 609 of prompting registration or login if a user is already logged into an account. In one embodiment, the registration or login prompts may occur only after a user selects a button. Otherwise, a user may peruse websites without needing to log in. After logging in, the user is authorized access to location information and his own account. Then, step 611 may occur, where the user's account is associated with the location information in, for example, cloud service 613. Associating the user account with the location information may include storing in the user's account, a point of interest from the cloud service 613 that is associated with the selected button. In one embodiment, the system 100 may execute step 615 and update the button to show that collection is complete. In one embodiment, the system 100 may deliver the location information to devices connected with the user account in step 617. For example, system 100 may automatically update all the collections from devices associated with the user account. Alternately, system 100 may provide users with a drop-down menu to select devices to receive the location information.

Figure 7:
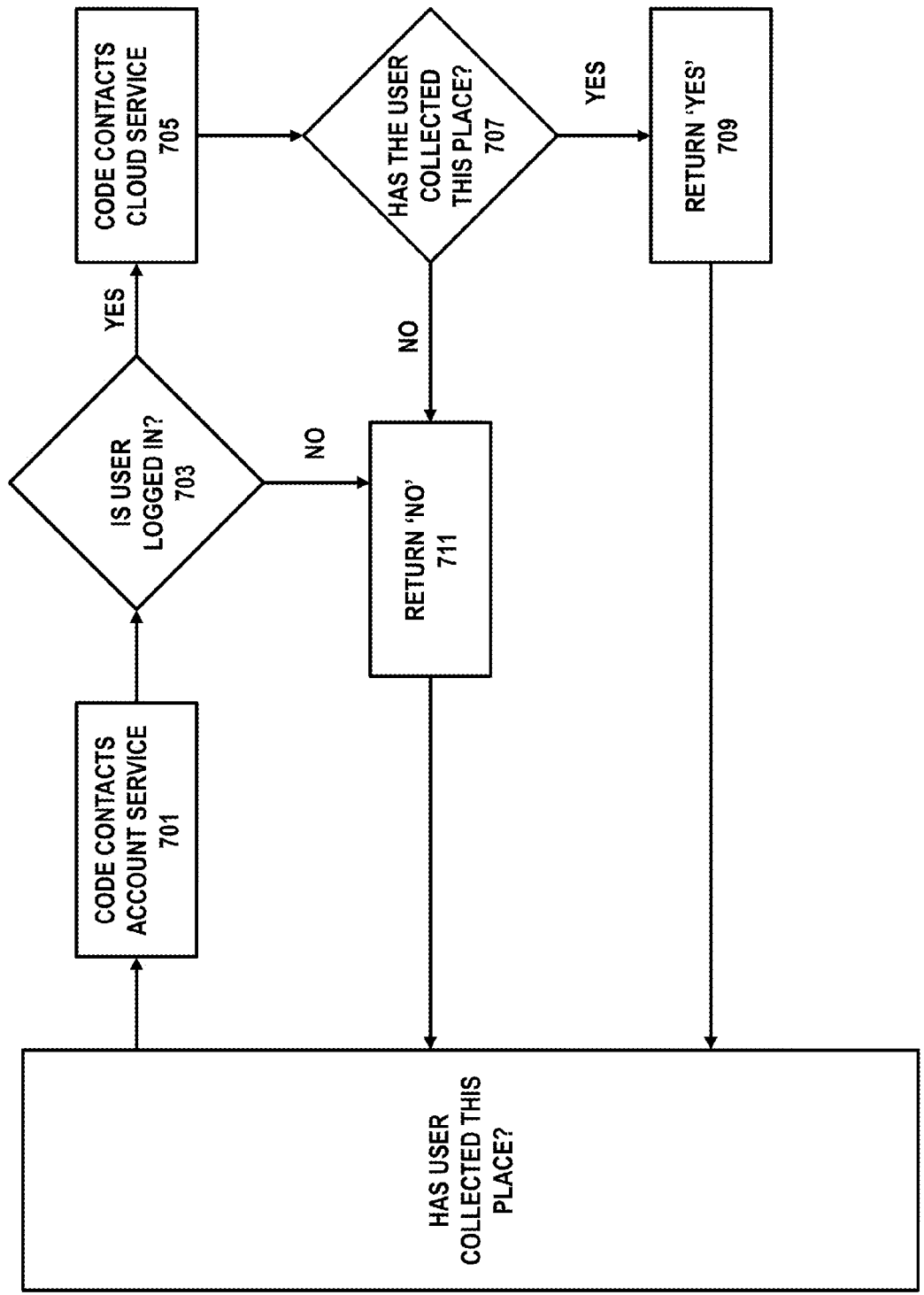
FIG. 7 is a diagram of determining whether to modify the user interface element, in one embodiment.

FIG. 7 is a diagram 700 of determining whether to modify the user interface element, according to one embodiment. In one embodiment, the process of diagram 700 may occur for the system 100 to determine if a user has collected location information from a website. For example in step 701, the code (accessed by the user interface element) may contact an account service. In step 703, the system 100 may determine if a user is logged in. For example, the system 100 may detect if a cookie is present in a user's browser. If the user is logged in, the system 100 may proceed to step 705 where the code may contact a cloud service to extract associated location information. Then, the system 100 may perform step 707 of confirming collection and consequently return the answer "yes (collection occurred)" for step 709. If a user is not logged in, system 100 may perform step 711 and return the answer, "no." This may indicate that collection has not occurred or that the system 100 is not aware of collection from the user since the user is not logged into his account. If "no" is returned from the process of diagram 700, the system 100 may present the user interface element with one graphical representation. If "yes" is returned, the system 100 may present a modified version of the graphical representation.

Figure 9B:
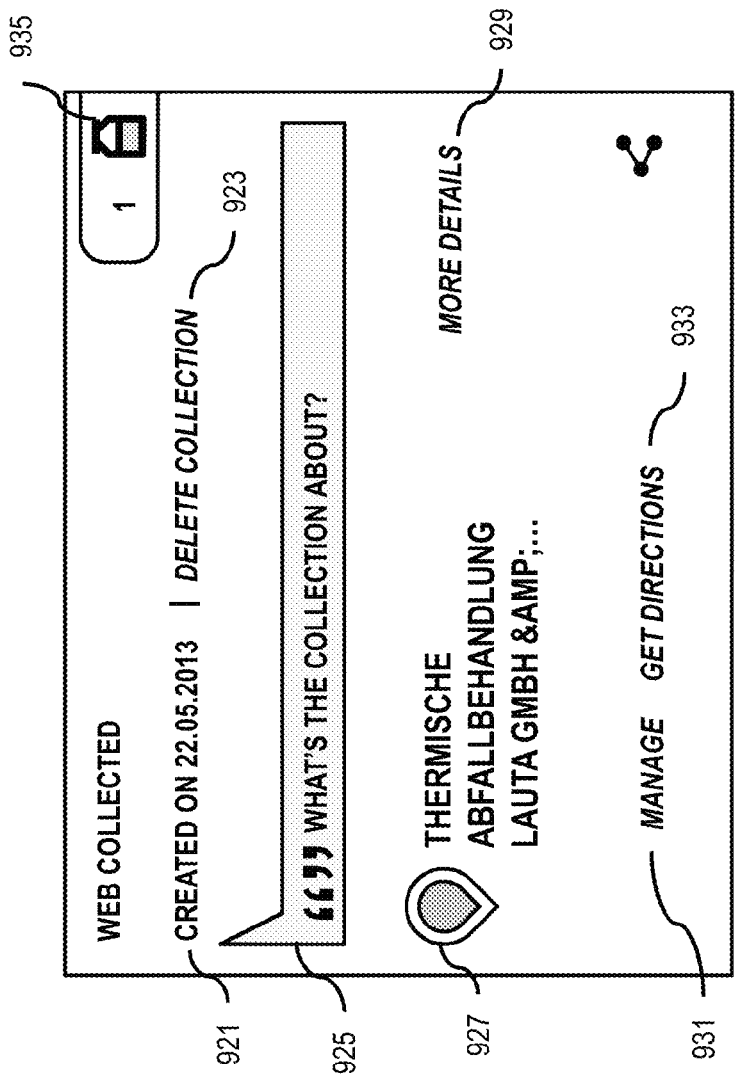
Figure 9A:
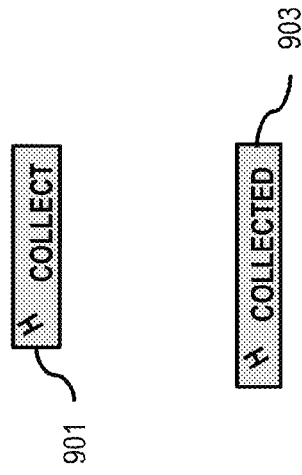

FIGS. 8, 9A, and 9B are diagrams of user interfaces utilized in the processes of FIG. 3, according to various embodiments. In one embodiment, display 800 may be the display for a business owner to create his code for the location information. For example, the display 800 may include instructions 801, directing owners to add "Collect" buttons to their websites. Then, options 803 may present owners with methods to add the location information. For example, options 803 may permit owners to search for the name, address, and location of the business via search window 805 or allow owners to select a location(s) from a map 807. After selection, display 800 may show the location information selected, created, and/or retrieved by the owner via verification lines 809. In a "Preview and code" area 811, the display 800 may permit users to preview the collect button and associated code containing the information from verification lines 809. For instance, "Preview and code" area may include preview button 813 and code lines 815.

In FIG. 9A, button 901 shows an embedded user interface element button before prior to user interaction with the button, in one embodiment. Button 903 shows a user interface element modification after a user has interacted with the button 901 and collected an associated place entity from the interaction. For example, after the user has extracted the associated location information (and therefore place entity), the website may change button 901 to button 903.

In FIG. 9B, display 920 shows a user's collected location information, in one embodiment. In one embodiment, the collection may sort by the date 921 on which the collection was made. In one embodiment, the display 920 may present options to the user regarding the collection. For example, display 920 may include delete option 923 and description option 925. Display 920 may then display location information 927 in an abbreviated form with details 929 available as an expanded option. Then, display 920 may also allow a manage button 931 and routing button 933 for a user to obtain navigation directions. The display 920 may further include a counter 935 showing the number of pieces of data collected in the collection.

In other embodiments, location information in collections may also be sorted, for example, by proximity to user location, user preference, projected user preference, number of collections by other users, most recently updated, most visited, etc. In a further embodiment, display 920 could include hierarchies of user preferences and/or collections. For instance, location information collected by a user's friends may take priority in the display 920 over information collected by users unrelated to the user.

The processes described herein for associating physical locations to websites may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
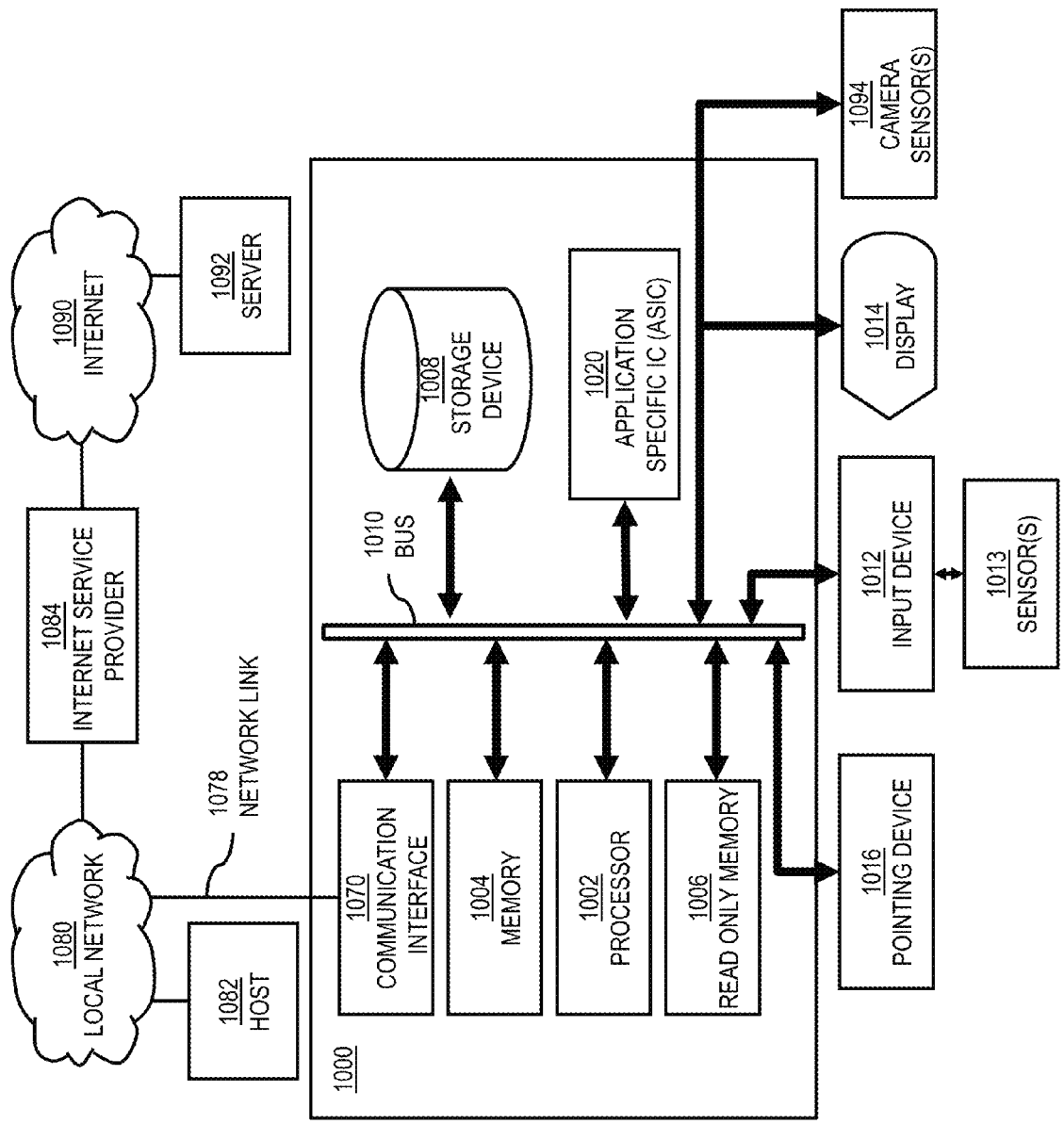
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to associate physical locations to websites as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of associating physical locations to websites.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to attaching physical locations to websites. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for associating physical locations to websites. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for associating physical locations to websites, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor 1013. A sensor 1013 detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for associating physical locations to websites to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, worldwide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein.

In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to attach physical locations to websites as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of associating physical locations to websites.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to attach physical locations to websites. The memory 1105 also stores the data associated with or generated by the execution of the inventive steps.

Figure 12:
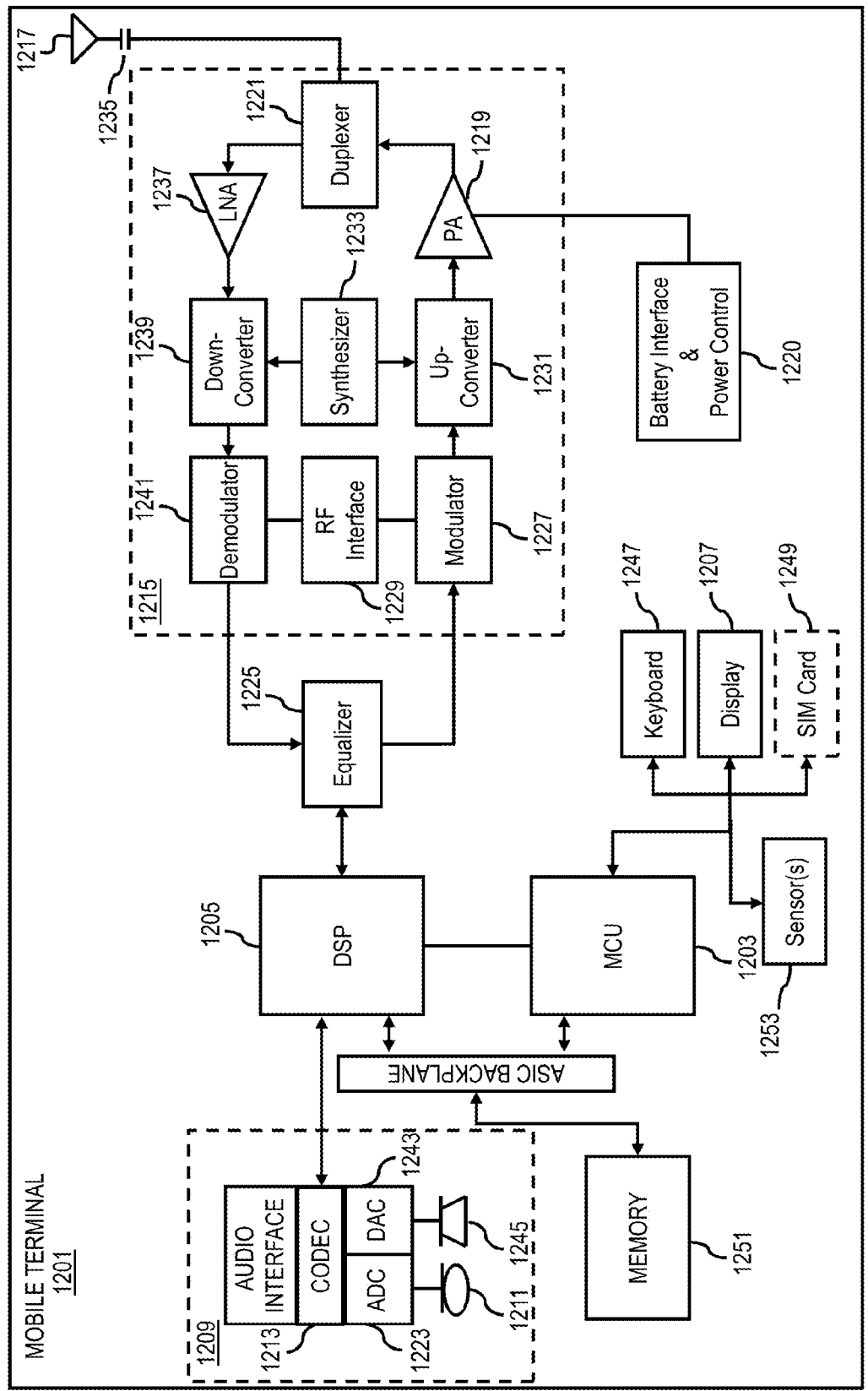
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of associating physical locations to websites. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of associating physical locations to websites. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to attach physical locations to websites. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method, comprising:
   determining, by a processor, one or more user interactions by at least one user with at least one computer readable user interface element embedded in at least one website of at least one online entity, wherein the at least one computer readable user interface element encodes one or more physical locations, in the form of one or more respective addresses, of the at least one online entity as extractable data in computer code data;
   electronically storing, by the processor, the one or more physical locations in at least one user collection database on a user storage device of a computer device based, at least in part, on the one or more user interactions;
   presenting one or more graphical representations, on a graphical user interface of the computer device, of status information with respect to the one or more physical locations in the at least one user collection database, the status information comprising an indication that the one or more physical locations is electronically stored in the at least one user collection database;
   in response to a request from a user to display a webpage of the website in the graphical user interface of the computer device, displaying the user interface element to the user as a graphical button on the webpage of the website, wherein the one or more interactions causes modifying the graphical button to indicate that the extractable data has been extracted; and
   in response to the request from the user to display the webpage of the website in the graphical user interface of the computer device, presenting the graphical representation wherein a completion of the storage of the location information causes a modification in the graphical button for the indication that the one or more physical locations is electronically stored in the at least one user collection database.

2. The method of claim 1, further comprising:
   processing the computer code data to cause, at least in part, an extraction, of the one or more physical locations.

3. The method of claim 2, further comprising:
   creating the computer code data based, at least in part, on the one or more physical locations.

4. The method of claim 1, further comprising:
   accessing the at least one user collection database to one or more applications, one or more other websites, or a combination thereof.

5. The method of claim 4, further comprising:
   receiving user account information, authorization to access one or more user accounts, or a combination thereof; and
   the accessing the at least one user collection database to the one or more applications, one or more other websites, or a combination thereof based, at least in part, on the user account information, authorization to access one or more user accounts, or a combination thereof.

6. The method of claim 1, further comprising:

determining a request from the at least one online entity for creation of the at least one computer readable user interface element, wherein the request specifies, at least in part, the one or more physical locations; and generating the at least one computer readable user interface element as the computer code data that (1) includes the one or more physical locations as the extractable data; (2) provides computer instructions for retrieving the one or more physical locations from at least one location database; or (3) a combination thereof.

7. The method of claim 1, further comprising:

presenting one or more graphical representations of status information with respect to the one or more user interactions.

8. The method of claim 7, wherein the presentation of one or more graphical representations of status information includes presenting a counter showing a number of times the extractable data is extracted.

9. The method of claim 1, wherein the online entity includes, at least in part, a website, a blog, a magazine, an internet portal, or a combination thereof.

10. The method of claim 1, comprising:

displaying the user interface element to the user as a graphical button on a webpage of the website, wherein the one or more interactions causes generating and displaying to the user a graphical drop-down list of devices including the user storage device, the user storage device being selected from the graphical drop-down list before the storing, or a graphical drop-down list of locations associated with the location information.

11. An apparatus comprising:

at least one processor; and at least one memory including computer program code for one or more programs, the at least one memory and the computer program code configured to, with the at least one processor, cause the apparatus to perform at least the following:

determining, by the at least one processor, one or more user interactions by at least one user with at least one computer readable user interface element embedded in at least one website of at least one online entity, wherein the at least one computer readable user interface element encodes one or more physical locations of the at least one online entity as extractable data in computer code data;

electronically storing, by the at least one processor, the one or more physical locations in at least one user collection database of a user storage device of a computer device based, at least in part, on the one or more user interactions;

presenting one or more graphical representations, on a graphical user interface of the computer device, of status information with respect to the one or more physical locations in the at least one user collection database, the status information comprising an indication that the one or more physical locations is electronically stored in the at least one user collection database;

in response to a request from a user to display a webpage of the website in the graphical user interface of the computer device, displaying the user interface element to the user as a graphical button on a webpage of the website, wherein the one or more interactions causes modifying the graphical button to indicate that the extractable data has been extracted; and in response to the request from the user to display the webpage of the website in the graphical user interface of the computer device, presenting the graphical representation wherein a completion of the storage of the location information causes a modification in the graphical button for the indication that the one or more physical locations is electronically stored in the at least one user collection database.

12. The apparatus of claim 11, wherein the at least one computer readable user interface element includes, at least in part, the computer code data, wherein the apparatus is further caused to perform:

processing the computer code data to cause, at least in part, extracting of the one or more physical locations.

13. The apparatus of claim 12, wherein the apparatus is further caused to:

cause, at least in part, a creating the computer code data based, at least in part, on the one or more physical locations.

14. The apparatus of claim 11, wherein the apparatus is further caused to:

cause, at least in part, accessing the at least one user collection database to one or more applications, one or more other websites, or a combination thereof.

15. The apparatus of claim 14, wherein the apparatus is further caused to:

cause, at least in part, receiving user account information, authorization to access one or more user accounts, or a combination thereof; and cause, at least in part, the accessing the at least one user collection database to the one or more applications, one or more other websites, or a combination thereof based, at least in part, on the user account information, authorization to access one or more user accounts, or a combination thereof.

16. The apparatus of claim 11, wherein the apparatus causes:

determining a request from the at least one online entity for creation of the at least one computer readable user interface element, wherein the request specifies, at least in part, the one or more physical locations; and generating the at least one computer readable user interface element as the computer code data that (1) includes the one or more physical locations as the extractable data; (2) provides computer instructions for retrieving the one or more physical locations from at least one location database; or (3) a combination thereof.

17. The apparatus of claim 11, wherein the apparatus causes:

presenting one or more graphical representations of status information with respect to the one or more user interactions.

18. The apparatus of claim 17, wherein the presentation of one or more graphical representations of status information includes presenting a counter showing a number of times the extractable data is extracted.

19. The apparatus of claim 11, wherein the online entity includes, at least in part, a website, a blog, a magazine, an internet portal, or a combination thereof.

* * * * *